May 23, 1933.  J. A. KNIGHT  1,911,123

MOTOR HEATER

Filed Jan. 9, 1930

Inventor
J. A. Knight
by J. Edw Maybee
ATTY

Patented May 23, 1933

1,911,123

UNITED STATES PATENT OFFICE

JOHN A. KNIGHT, OF HAMILTON, ONTARIO, CANADA

MOTOR HEATER

Application filed January 9, 1930. Serial No. 419,600.

This invention relates to heaters for warming the cylinder blocks of internal combustion engines to facilitate starting in cold weather, and my object is to devise a simple, rugged and efficient electric heater which is so connected that the cylinder block is maintained at a high temperature with a relatively small expenditure of electric energy.

I attain my object by connecting a tubular electric water heater by means of flexible tubing with the interior of the water jacket of the engine block at different levels.

The heater comprises a tubular chamber forming a water passage on the outside of which is applied a heating element. A divided casing is clamped about the water chamber and is shaped to provide a space surrounding the water chamber which is filled with heat insulating material. This casing carries the terminals for the heating element, and also means whereby the device may be secured to the engine pan or other suitable part.

The whole is constructed in detail substantially as described and as illustrated in the accompanying drawing in which—

Figures 2, 3:
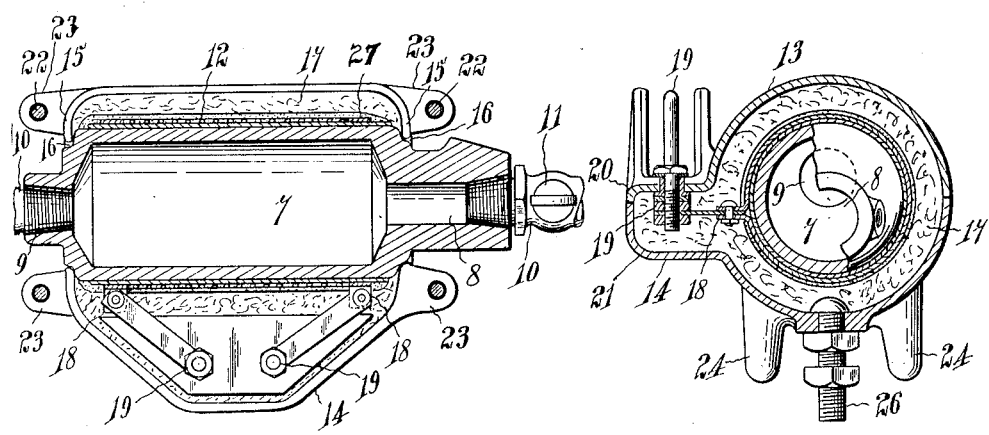
Fig. 2 is a longitudinal section of the heater.

Fig. 3 a cross section of the heater; and

Figure 4:
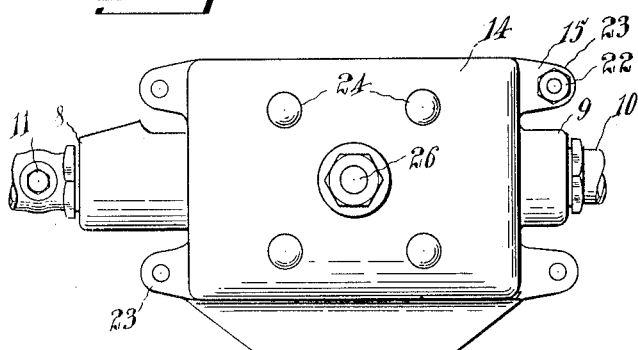

Fig. 4 a plan view of the heater from the under side with the lower half of the casing removed.

In the drawing like numerals of reference indicate corresponding parts in the different figures.

Figure 1:
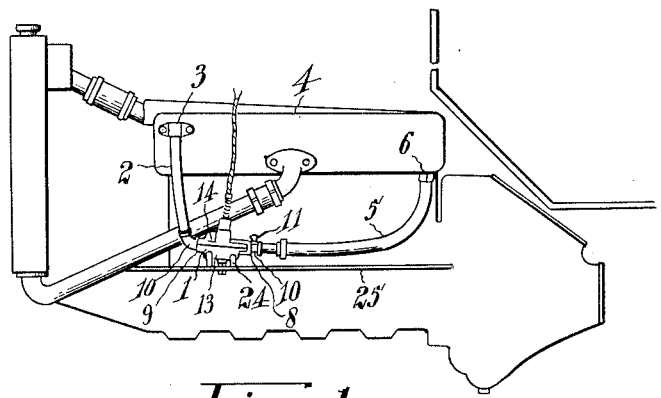
Fig. 1 is a side elevation showing my heater as installed.

Referring to Fig. 1 of the drawing, 1 is the heater from which leads a flexible tube 2 to a nipple 3 tapped in the cylinder block 4 adjacent the upper end of its water jacket, while a similar flexible water tube 5 leads to the heater from a nipple 6 tapped into the water jacket of the cylinder block adjacent its lower side.

The heater itself is constructed as follows: 7 is a tubular water chamber having an inlet 8 formed at the lower side at one end and an outlet 9 formed at the upper side of the other end, thus facilitating the circulation of water through the chamber. The inlet and outlet are tapped to receive the connections 10 whereby the flexible tubes 2 and 5 are connected to the heater. One of these connections is provided with a cock 11 whereby the circulation may be controlled.

Wound on the water chamber, but insulated therefrom, is an electrical resistance 12 formed of a flat rivet of michrome wire wound in a helix with closely spaced turns and held tightly at the ends by the clamps 27. Suitable insulation is also applied over this heating element. The water chamber is fitted within a casing comprising the longitudinally separate parts 13 and 14. The parts of this casing are formed with the flanges 15 adapted to engage ravvets 16 formed in the ends of the water chamber 7. The flanges 15 serve to space the walls of the casing from the outer surface of the water chamber and the space thus formed is filled with mineral wool or other heat insulating material 17. To opposite ends of the resistance 12 are connected the lead strips 18, which are secured to the clamps 27 and to the inner ends of terminals 19 which pass through but are suitably insulated from a lateral extension 20 formed on the part 13 of the casing. A lateral extension 21 on the part 14 of the casing serves as a cover for the lead strips and the inner ends of the terminals 19. Bolts 22 passing through lugs 23 on the casing serve to connect the parts of the casing and to hold it in position on the water chamber 7. Legs 24 are formed on the under side of the part 14 of the casing, which are of unequal length so that, when the casing is stood on the engine pan 24, the water chamber is in an inclined position as shown, thus facilitating circulation. The threaded stem 26 secured to the underside of the part 4 of the casing provides means whereby the device is secured to the engine pan.

From the above description it will be seen that the device is very cheap and simple, as the parts 7, 13 and 14 are all castings, while the remaining parts are easily made and readily assembled.

A further feature of the arrangement of my device is that the water circulation is directly through the water jacket of the engine block, whereby a high temperature is attained therein with a minimum expenditure of electrical energy.

The parts immediately connected with the engine block are well heated by conduction so that the lubricating oil is maintained in good condition for effective lubrication the moment the engine is started.

The water in the radiator, if an anti-freeze solution be not employed, is maintained at a sufficiently high temperature to prevent freezing, but not high enough to cause considerable losses by radiation.

What I claim as my invention is:—

1. An electric water heater comprising a tubular chamber having a water inlet at one end and an outlet at the other; an electric heating element applied about the central portion of said chamber insulated from the chamber; metallic bands clamped around said insulation adjacent to the ends of said heating element whereby said heating element may be connected to said bands, said bands having projected ends adapted for use with screw or other means for tightening said bands and for connecting said heating element to said bands and further adapted for attachment by connecting strips to electrical terminals, said electrical terminals being carried by a suitable casing surrounding said tubular chamber and insulated from said terminals and said heating element.

2. An electric water heater for internal combustion engines comprising a tubular chamber having a water inlet at one end and an outlet at the other; an electric heating element applied about the central portion of said chamber insulated from the chamber; metallic bands clamped around said insulation adjacent to the ends of said heating element whereby said heating element may be connected to said bands, thereby maintaining said heating element in position on said insulation; means for tightening said bands having projected ends adapted for attachment by connecting strips to electrical terminals; a casing engaging ends of said tubular chamber but spaced from the middle part thereof, said casing being divided longitudinally; means for securing the halves of the said casing together, one half of said casing having a projection or shelf extending in an approximate radial direction from said tubular chamber; electric terminals supported by said shelf approximately at right angles to a radial line through said chamber and insulated from said casing; and connecting strips attached from said bands to said terminals.

3. An electric water heater comprising a tubular chamber having a water inlet at one end and an outlet at the other; an electric heating element applied about said tubular chamber and insulated from said chamber; said element being formed of a ribbon shaped resistance material wound in the form of a helix with space between turns being less than the width of the ribbon, said resistance winding being applied under tension and suitable means provided for maintaining the tension on said winding, whereby a large heat conducting surface is brought into intimate contact with the insulation surrounding said tubular chamber and into high thermal conductive relation with said tubular chamber for the purpose described.

4. An electric water heater comprising a tubular chamber having a water inlet at one end and an outlet at the other; an electric heating element applied about said tubular chamber and insulated from said chamber; said element being formed of a ribbon shaped resistance material wound in the form of a helix with space between turns being less than the width of the ribbon, said resistance winding being applied under tension; metallic bands clamped around said insulation adjacent to the ends of said heating element whereby said heating element may be connected to said bands, thus maintaining the tension on said heating element and adapted for connection to electric terminals by means of conducting wires or strips.

5. An electric water heater for internal combustion engines comprising a tubular chamber having a water inlet at one end and an outlet at the other, an electric heating element applied about said tubular chamber and insulated from said chamber; a casing engaging the ends of the chamber but spaced from the middle part thereof, said casing being divided longitudinally; means for securing the halves of the said casing together, one half of said casing having a projection or shelf extending in an approximate radial direction from said tubular chamber; electric terminals supported by said shelf approximately at right angles to a radial line through said chamber, and insulated from said casing; a guard forming a part of said casing and protecting the outer ends of said terminals.

6. An electric water heater for internal combustion engines comprising a tubular chamber having a water inlet at one end and an outlet at the other; an electric heating element applied about the central portion of said tubular chamber; a casing engaging the ends of the chamber but spaced from the middle part thereof, said casing being divided longitudinally; means for securing the halves together and one half of said casing having a projection or shelf extending in an approximate radial direction from said tubular chamber; electric terminals supported by and insulated from said shelf; a guard attached to said shelf protecting the outer ends of said terminals, the other half of said casing surrounding but insulated from the inner ends of said terminals forming a sealed chamber about the same and provided with lugs for supporting said casing; a means for attaching said casing in a position to maintain said tubular chamber at an angle to the surface against which the heater is attached.

Signed at Hamilton this 23rd day of December, 1929.

J. A. KNIGHT.